(12) United States Patent
Marques

(10) Patent No.: US 7,773,596 B1
(45) Date of Patent: Aug. 10, 2010

(54) DISTRIBUTION OF TRAFFIC FLOW CRITERIA

(75) Inventor: Pedro R. Marques, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1781 days.

(21) Appl. No.: 10/782,291

(22) Filed: Feb. 19, 2004

(51) Int. Cl.
H04L 12/28 (2006.01)
H04L 12/56 (2006.01)

(52) U.S. Cl. .................. 370/392; 370/400; 709/238

(58) Field of Classification Search ............ 370/238, 370/351, 352, 389, 392, 400, 408, 409, 463; 709/238–242
See application file for complete search history.

(56) References Cited

U.S. PATENT DOCUMENTS

| | | | |
|---|---|---|---|
| 6,055,561 A * | 4/2000 | Feldman et al. ........... 709/200 |
| 6,266,704 B1 | 7/2001 | Reed et al. |
| 6,339,595 B1 * | 1/2002 | Rekhter et al. ........... 370/392 |
| 6,507,914 B1 | 1/2003 | Cain et al. |
| 6,594,268 B1 | 7/2003 | Aukia et al. |
| 6,735,702 B1 | 5/2004 | Yavatkar et al. |
| 6,772,347 B1 | 8/2004 | Xie et al. |
| 6,910,148 B1 | 6/2005 | Ho et al. |
| 7,080,161 B2 * | 7/2006 | Leddy et al. ............ 709/250 |
| 7,120,931 B1 | 10/2006 | Cheriton |
| 7,136,374 B1 * | 11/2006 | Kompella .............. 370/352 |
| 7,139,242 B2 * | 11/2006 | Bays .................. 370/238 |
| 7,154,889 B1 * | 12/2006 | Rekhter et al. ........... 370/392 |
| 7,215,637 B1 | 5/2007 | Ferguson et al. |
| 7,299,296 B1 | 11/2007 | Lo et al. |
| 7,421,487 B1 * | 9/2008 | Peterson et al. ........... 709/223 |
| 7,467,227 B1 | 12/2008 | Nguyen et al. |
| 2002/0101819 A1 | 8/2002 | Goldstone |
| 2002/0165981 A1 * | 11/2002 | Basturk et al. ........... 709/242 |
| 2002/0198687 A1 | 12/2002 | Dewan et al. |
| 2003/0016672 A1 | 1/2003 | Rosen et al. |
| 2003/0076248 A1 * | 4/2003 | Larson ................. 341/104 |
| 2003/0118029 A1 | 6/2003 | Maher, III et al. |
| 2003/0212900 A1 | 11/2003 | Liu et al. |
| 2005/0175341 A1 * | 8/2005 | Ovadia ................ 398/43 |

OTHER PUBLICATIONS

U.S. Appl. No. 10/080,865, entitled "Distributed Filtering for Networks", filed Feb. 21, 2002, Ross Callon.

U.S. Appl. No. 10/234,455, entitled "Systems and Methods for Identifying Sources of Network Attacks", filed Sep. 5, 2002, Ben Eater, Rob Jaeger.

(Continued)

Primary Examiner—William Trost, IV
Assistant Examiner—Roberta A Shand
(74) Attorney, Agent, or Firm—Shumaker & Sieffert, P.A.

(57) ABSTRACT

Traffic flow criteria are distributed between routing devices. More specifically, a routing protocol, such as the Border Gateway Protocol (BGP), may be extended in a manner that allows fine-grain criteria to be conveyed for application to network traffic. For example, a flow specification data type may be defined in accordance with BGP to allow a variable number of packet flow attributes to be specified, such as source information, destination information, port information, protocol or other flow criteria. In this manner, traffic flow criteria are specified in a way that cannot be expressed using destination address prefixes only. The flow specification data type may be defined as network layer reachability information (NLRI) that is associated with a route advertised in accordance with BGP.

90 Claims, 8 Drawing Sheets

OTHER PUBLICATIONS

Gibson, Steve, "DRDoS—Description and Analysis of a Potent, Increasingly Prevalent, and Worrisome Internet Attack," Gibson Research Corporation, Feb. 2002, www.grc.com/dos/drdos.htm.

U.S. Appl. No. 10/281,446, entitled "Dynamically Inserting Filters Into Forwarding Paths of a Network Device," filed Oct. 25, 2002, Scott Mackie.

U.S. Appl. No. 10/246,244, entitled "Filtering Data Flows Based on Associated Forwarding Tables," filed Sep. 18, 2002, Jeffrey Lo, Scott Mackie.

U.S. Appl. No. 10/361,715, entitled "Automatic Filtering to Prevent Network Attacks," filed Feb. 7, 2003, Bruno Rijsman.

U.S. Appl. No. 10/455,189, entitled "Automatic Configuration of Source Address Filters Within a Network Device," filed Jun. 5, 2003, Ross W. Callon.

Notice of Allowance for U.S. Appl. No. 10/281,446, mailed Dec. 17, 2009, 16 pp.

Office Action from U.S. Appl. No. 12/125,997, dated Feb. 9, 2010, 16 pp.

* cited by examiner

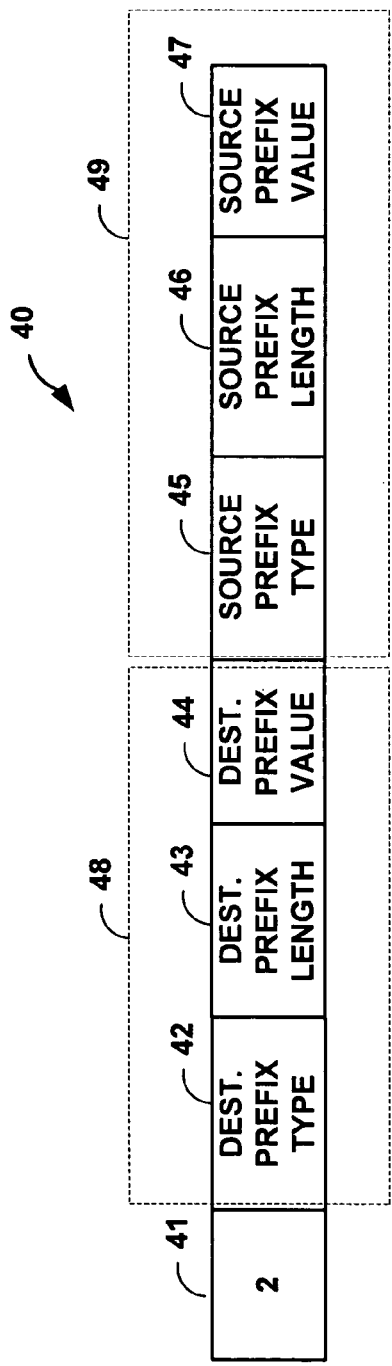
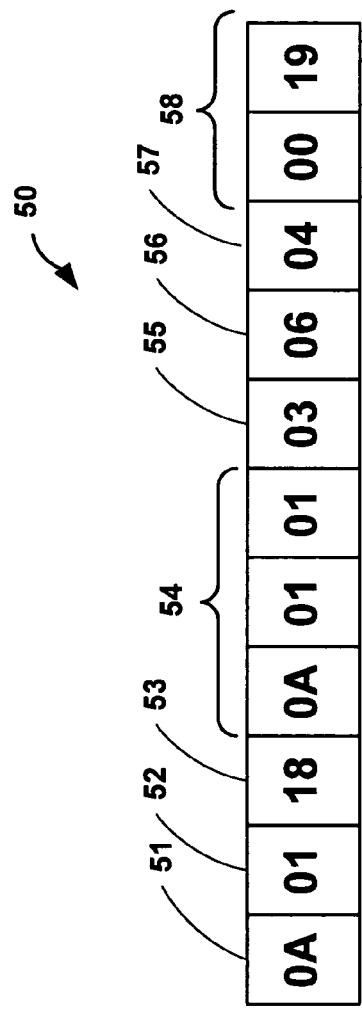
FIG. 4A
FIG. 4B

DISTRIBUTION OF TRAFFIC FLOW CRITERIA

TECHNICAL FIELD

The invention relates to computer networks and, more particularly, to filtering network traffic within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Conventional routers often maintain the routing information in the form of one or more routing tables or other data structures. The form and content of the routing tables often depend on the particular routing algorithm implemented by the router.

Upon receiving incoming packets, the routers examine information within the packets, and forward the packets in accordance with the routing information. In order to maintain an accurate representation of the network, routers periodically exchange routing information in accordance with routing protocols, such as the Border Gateway Protocol (BGP), the Intermediate System to Intermediate System (ISIS) protocol, the Open Shortest Path First (OSPF) protocol, and the Routing Information Protocol (RIP).

When two routers initially connect, they typically exchange routing information. From then on, the routers send control messages to incrementally update the routing information when the network topology changes. For example, the routers may send update messages to advertise newly available routes, and to withdraw routes that are no longer available.

A network device, such as a router, customer server, workstation, or other device, can be susceptible to a network attack, such as a denial of service (DoS) attack. A DoS attack, for example, occurs when a malicious party directs a high volume of packets to the network device in an attempt to sabotage network operation. The high traffic volume can overwhelm the network device, leaving it unable to process the inbound packets. For example, in one type of DoS attack, a perpetrator sends a large number of "ping" requests to network broadcast addresses, which are special addresses used to broadcast messages to other devices on the network. When sending the requests, the perpetrator spoofs the source address of a network device targeted by the attack. In response to the requests, the other network devices reply to the targeted routing device, thereby inundating the targeted routing device with packets.

One technique for preventing or otherwise reducing the effects of network attacks is to drop network traffic that is associated with a specified network destination. In some instances, routing protocols have been used to convey information describing the network destination. For example, some network service providers currently utilize BGP to distribute routing entries that specify network destinations for which traffic is to be dropped. These techniques, however, provide little flexibility as the BGP routing entries "mark" the network destinations in a manner to indicate that all traffic bound for those destinations should be dropped.

SUMMARY

In general, the invention involves techniques for distributing traffic flow criteria between routing devices. More specifically, the techniques allow a routing protocol, such as the Border Gateway Protocol (BGP), to be extended in a manner that allows fine-grain criteria to be communicated between routing devices for application to network traffic. For example, BGP can be extended in a manner that allows specific packet flows to be identified in accordance with a variable number of criteria, such as source information, destination information, port information, protocol or other flow criteria. In this manner, the techniques allow for the specification of fine-grain traffic flow definitions.

In accordance with the techniques described herein, a flow specification data type is defined for a routing protocol, such as BGP. The flow specification data type may, for example, be defined as network layer reachability information (NLRI) associated with an advertised route. Consequently, the flow specification data type may be used to encode traffic flow criteria to direct other routing devices to control network traffic associated with the advertised route. The flow specification data type is defined in an extensible manner that allows a variable number of packet flow attributes to be specified. Moreover, the flow specification data type is defined in a manner that causes the encoded traffic flow criteria to be treated as opaque BGP data. As a result, routers and other network devices that do not support the extension ignore the encoded traffic flow criteria.

The traffic flow criteria are communicable via the routing protocol, and applied by the receiving device to control traffic flow. Example applications to the network traffic include load balancing, rate limiting, logging, filtering or other applications. For example, a router or other network device may automatically drop network traffic having characteristics that match the traffic flow criteria.

In one embodiment, a method comprises defining a flow specification data type for a routing protocol, wherein the flow specification data type allows a variable number of packet flow attributes to be specified. The method further comprises generating a message that encodes traffic flow criteria in accordance with the flow specification data type, and communicating the message to a routing device to direct the routing device to control network traffic based on the traffic flow criteria.

In another embodiment, a method comprises receiving routing communication that encodes traffic flow criteria in accordance with a flow specification data type for a routing protocol, wherein the flow specification data type allows a variable number of packet flow attributes to be specified, and controlling network traffic in accordance with the traffic flow criteria.

In an additional embodiment, a network device comprises a control unit and an interface card. The control unit generates a message that encodes traffic flow criteria in accordance with a flow specification data type, wherein the flow specification data type allows a variable number of packet flow attributes to be specified. The interface card communicates the message to a routing device via a routing protocol, wherein the message directs the control unit to apply an appropriate action on network traffic based on the traffic flow criteria.

In a further embodiment, a network device comprises an interface card and a control unit. The interface card receives routing communication that encodes traffic flow criteria in accordance with a flow specification data type for a routing protocol, wherein the flow specification data type allows a variable number of packet flow attributes to be specified. The control unit compares network traffic to the traffic flow criteria, and applies an appropriate action to the network traffic.

In another embodiment, a system comprises a first network device to generate a message that encodes traffic flow criteria in accordance with a flow specification data type, and communicate the message to a second routing device via a routing protocol. The flow specification data type allows a variable number of packet flow attributes to be specified. The system further comprises a second network device to receive the message, compare network traffic to the traffic flow criteria, and apply an appropriate action to the network traffic based on the traffic flow criteria.

In another embodiment, a computer-readable medium comprises instructions that cause a programmable processor to define a flow specification data type for a routing protocol, wherein the flow specification data type allows a variable number of packet flow attributes to be specified. The instructions further cause the programmable processor to generate a message that encodes traffic flow criteria in accordance with the flow specification data type, and communicate the message to a routing device to direct the routing device to control network traffic based on the traffic flow criteria.

In another embodiment, a computer-readable medium comprises instructions that cause a programmable processor to receive routing communication that encodes traffic flow criteria in accordance with a flow specification data type for a routing protocol, wherein the flow specification data type allows a variable number of packet flow attributes to be specified. The instructions further cause the programmable processor to control network traffic in accordance with the traffic flow criteria.

The techniques of the invention may provide one or more advantages. For example, the invention may aid in protecting network devices from being targeted by network attacks, such as Denial of Service (DoS) attacks. Routing devices may apply the techniques to exchange fine-grain traffic flow definitions and provide increased control over which packets are allowed to enter a particular network, e.g., a customer network. In other words, the invention may increase the granularity of control to which traffic flow criteria can be specified and communicated. Consequently, the routing devices may apply the techniques to prevent or reduce network attacks on devices within the customer networks, such as routers, customer servers or workstations, or other devices.

In practice, the techniques described herein can be applied to an existing routing protocol, such as BGP, thereby reusing protocol algorithms, operational experience, and administrative processes, such as inter-provider peering agreements. In short, the techniques of the invention may utilize an already established communications infrastructure. Consequently, deployment of the techniques described herein may be accelerated by utilization of these existing systems. The established communications infrastructure includes an internal route distribution infrastructure, and external relationships, such as inter-domain BGP sessions to a customer network.

Details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4A illustrates an exemplary encoding of a destination prefix and a source prefix in accordance with the defined flow specification data type.

FIG. 4B illustrates an exemplary embodiment of traffic flow criteria encoded in accordance with the redefined data field.

DETAILED DESCRIPTION

Figure 1:
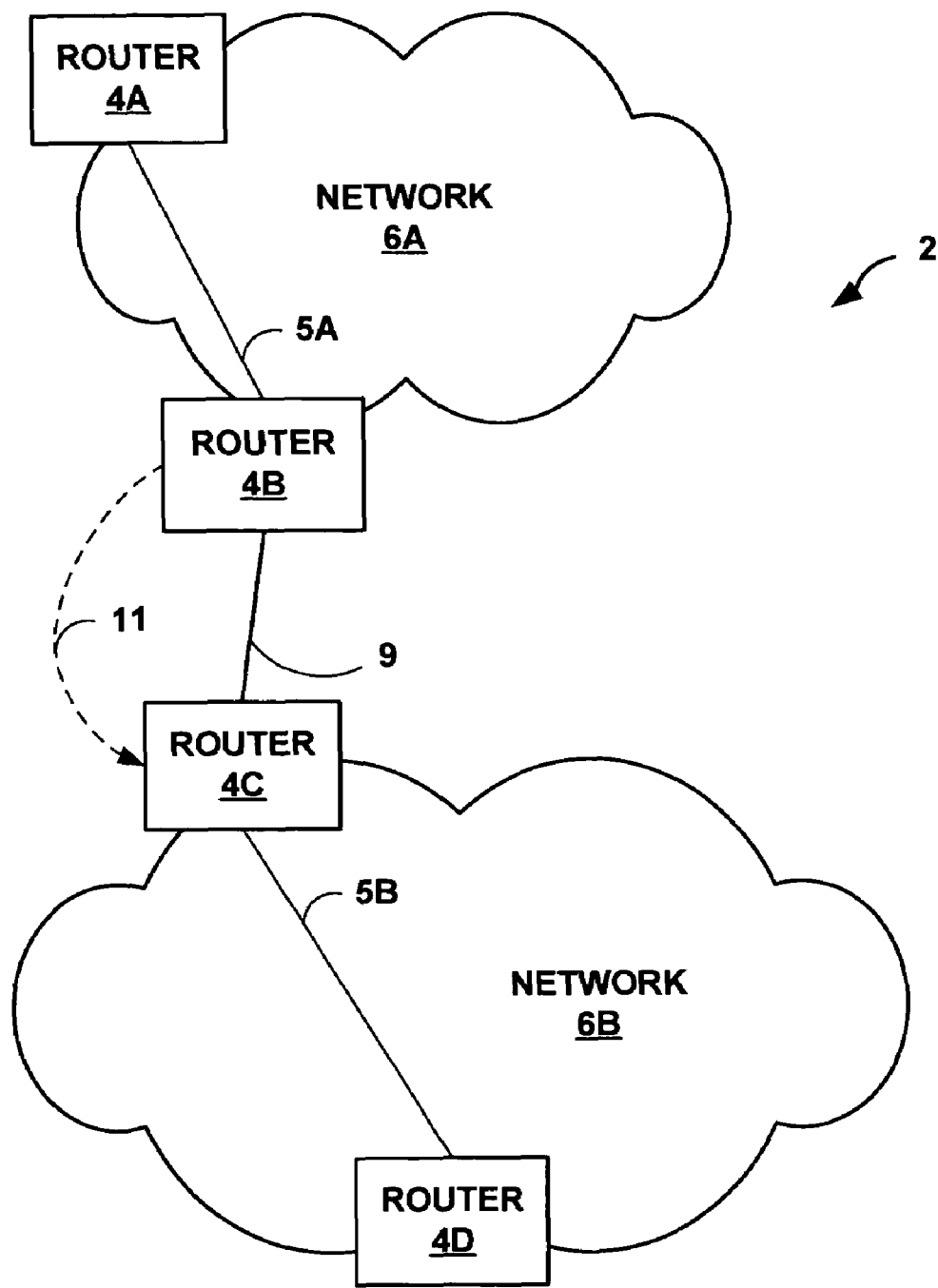
FIG. 1 is a block diagram illustrating an example system in which routers exchange traffic flow criteria to control the flow of network traffic consistent with the principles of the invention.

FIG. 1 is a block diagram illustrating an example system 2 in which routers 4A-4D (collectively, "routers 4") distribute traffic flow criteria to control the flow of network traffic consistent with the principles of the invention. In the illustrated example of FIG. 1, routers 4 route traffic through interconnected networks 6A and 6B (collectively, "networks 6"). In particular, router 4A is coupled to router 4B via link 5A, and router 4C is coupled to router 4D via link 5B. Link 9 provides connectivity between networks 6A and 6B.

Each of networks 6A and 6B include one or more computing devices (not shown), such as personal computers, laptop computers, handheld computers, workstations, servers, switches, printers, and the like. In addition, networks 6 may include a variety of other network devices for forwarding network traffic, such as routers, switches, servers, and the like. The configuration of system 2 is merely exemplary, and routers 4 may reside in a single network or within multiple networks. Nonetheless, for ease of description, separate networks 6A and 6B are illustrated in FIG. 1.

In order to maintain an accurate representation of networks 6A and 6B, routers 4 periodically exchange routing information in accordance with one or more routing protocols, such as the Border Gateway Protocol (BGP), the Intermediate System to Intermediate System (ISIS) protocol, the Open Shortest Path First (OSPF) protocol, and the Routing Information Protocol (RIP).

In accordance with this disclosure, routers 4 utilize a flow specification data type as defined herein to exchange traffic flow criteria. The flow specification data type is defined for use with an existing protocol, such as BGP, so that the traffic flow criteria can be easily exchanged between routing devices 4.

In one example, the flow specification data type is defined as network layer reachability information (NLRI) for the BGP protocol, and can be associated with routes advertised in accordance with the BGP protocol. The NLRI can be encoded using a variable number of attributes. The attributes may, in one embodiment, include MP_REACH_NLRI and MP_UN-REACH_NLRI as defined by BGP-MP. In some embodiments, the NLRI is treated as an opaque bit string prefix by BGP. As a result, any routers or other network devices that do not support the extension ignores the encoded traffic flow criteria.

Because the flow specification data type can be associated with advertised routes, e.g., as NLRI information, any of routing devices 4 may use the flow specification data type to encode traffic flow criteria and direct the other routing devices to control network traffic associated with the advertised route in accordance with the traffic flow criteria. The flow specification data type may be defined in an extensible manner that allows a variable number of packet flow attributes to be specified. A number of possible attributes, or components, will be described in more detail below.

In one embodiment, the flow specification data type is defined as an "application-specific" data type in accordance with a routing protocol. As a result, policies are defined to direct any of routers 4 that receive the traffic flow criteria to install the traffic flow criteria within a separate routing information base (RIB). In other words, the presence of an application specific identifier indicates that a routing communication includes encoded traffic criteria consistent with the principles of the invention, and any advertised routes within the routing communication should be installed within a separate RIB.

In one embodiment, the specific identifier includes an Address Family Identifier (AFI) and Subsequent Address Family Identifier (SAFI) to the flow specification data type. Routers 4 implement policies that selectively enable distribution of the traffic flow criteria based on the application-specific identifier.

In this manner, the flow specification data type permits BGP, for example, to be extended in a manner that allows specific packet flows to be identified. When advertising routes, routers 4 may encode a variety of optional traffic flow criteria within the defined components of the flow specification data type. Example traffic flow criteria that may be specified with the flow specification data type includes source information, destination information, port information, protocol, ICMP type, packet length or other flow criteria. Accordingly, the techniques provide a finer level of control over packets flows that are permitted within networks 6A and 6B or between the networks. In accordance with the define flow specification data type, each traffic flow criteria component is associated with a numeric type value. The components may be ordered within the flow specification data type according to the numeric type value.

Traffic flow criteria within a BGP packet is distributed from a distributing router, such as router 4B, to a receiving router, such as router 4C, as illustrated by routing communication 11. Consequently, router 4C may be automatically configured to identify packets that match the received traffic flow criteria, and apply an appropriate action to the identified packets. In an alternative embodiment, router 4C applies an appropriate action to packets that do not match the traffic flow criteria. Appropriate actions provide control of traffic flow, which includes one of load balancing, rate limiting, logging, filtering, or other actions.

Figure 2:
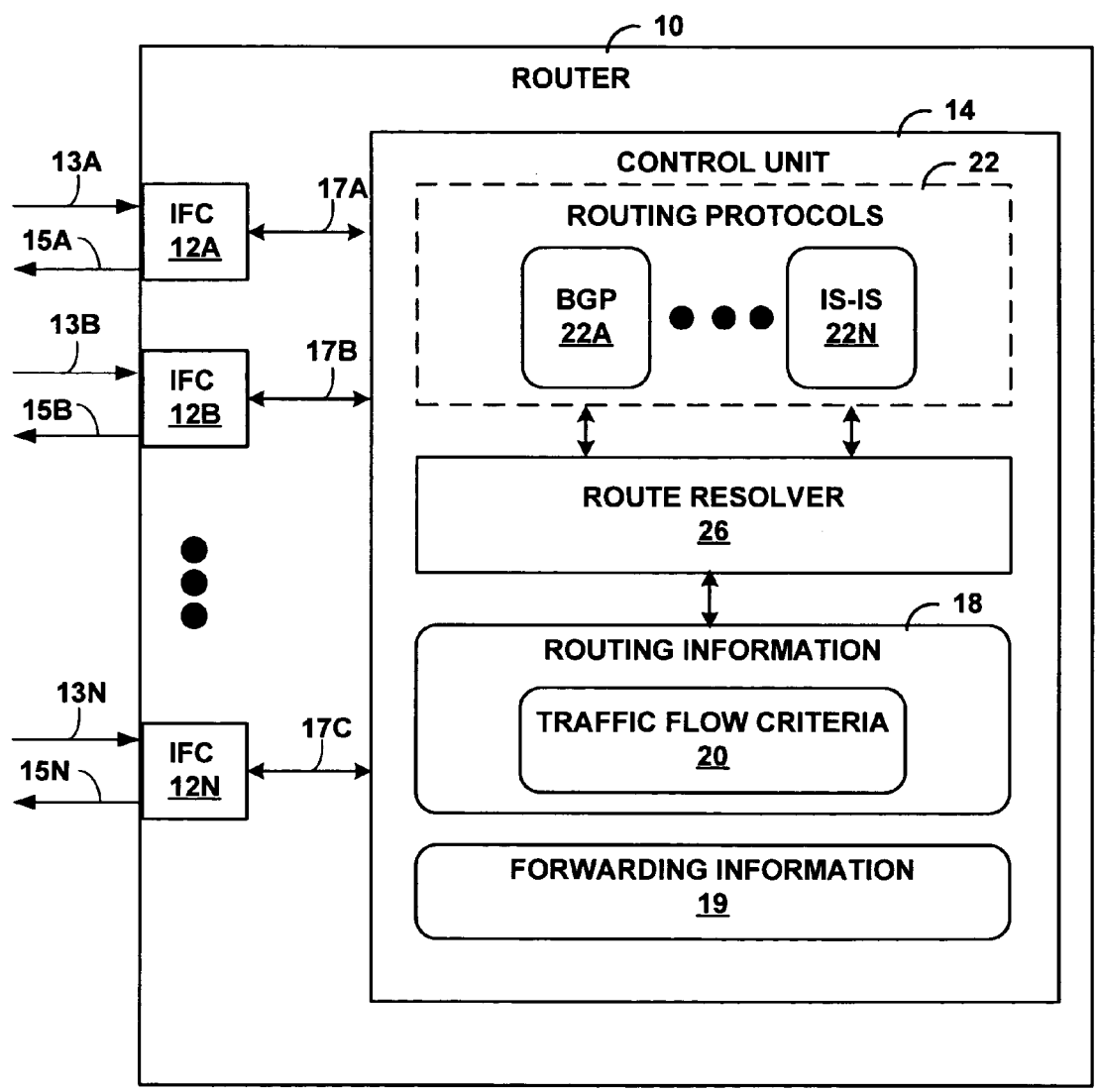
FIG. 2 is a block diagram illustrating an exemplary embodiment of a router that distributes or receives traffic flow criteria consistent with the principles of the invention.

FIG. 2 is a block diagram illustrating an exemplary embodiment of a router 10 that distributes or receives traffic flow criteria 20 throughout a network consistent with the principles of the invention. In addition, router 10 may control the flow of network traffic by applying an appropriate action to packets whose characteristics match traffic flow criteria 20.

In the illustrated embodiment, router 10 includes interface cards 12A-12N (collectively, "IFCs 12") that receive and send packet flows via network links 13A-13N (collectively, "network links 13") and 15A-15N (collectively, "network links 15"), respectively. IFCs 12 are typically coupled to network links 13, 15 via a number of interface ports (not shown), and forward and receive packets and control information from control unit 14 via a respective one of paths 17A-17N (collectively, "paths 17"). Router 10 may include a chassis (not shown) having a number of slots for receiving a set of cards, including IFCs 12. Each card may be inserted into a corresponding slot of a chassis for communicably coupling the card to a control unit 14 via a bus, backplane, or other electrical communication mechanism.

Control unit 14 comprises routing protocols 22A-22N (collectively, "routing protocols 22"), a route resolver 26, and routing information 18. Routing protocols 22 represent a set of routing protocols implemented via control unit 14, e.g, via one or more software processes. Router 10 exchanges routing information 18 with other routing devices in accordance with routing protocols 22, thereby learning the topology of the network and, more specifically, routes to other network devices within the network. Routing protocols 22 may include exterior routing protocols to exchange routing information 18 with routers of other domains or autonomous systems, e.g. via the BGP routing protocol. In addition, or alternatively, routing protocols 22 may include interior routing protocols, e.g., the IS-IS routing protocol, to learn of "internal" routes, i.e., routes to destinations within the same network as router 10. Control unit 14 receives routing information 18 from other routing devices in accordance with routing protocols 22. Based on routing information 18, route resolver 26 generates forwarding information 19 that associate destination information, such as IP address prefixes, with specific forwarding next hops (FNHs) and corresponding interface ports of IFCs 12. Forwarding information 19 may, therefore, be thought of as based on the information contained within routing information 18. Route resolver 26 maintains routing information 18 and forwarding information 19 in the form of one or more tables, databases, link lists, radix trees, databases, flat files, or any other data structures.

In accordance with the principles of the invention, router 10 may utilize one or more routing protocols 22 to distribute or receive traffic flow criteria 20, which generally represent filtering criteria for identification of network packet flows. BGP protocol 22A may be, for example, extended in a manner that allows traffic flow criteria 20 to be conveyed to and received from other routers for application to network traffic. As described herein, the protocol extension allows a variable number of traffic flow criteria 20 to be specified and communicated to other routing devices for matching packet flows. For example, source address, destination address, source port, destination port, protocol, quality of service (QoS) level, and/or other flow criteria may be specified in accordance with the techniques described herein.

In order to convey traffic flow criteria 20, a flow specification data type is described herein for encoding traffic flow criteria. The flow specification data type may, for example, be defined in accordance with one of routing protocols 22, e.g., BGP 22A, so that the encoded traffic flow criteria may be associated with routes advertised according to the protocol. In this manner, when sharing routing information 18 with other routers, control unit 14 may readily encode traffic flow criteria 20 and communicate the traffic flow criteria with the routing information.

For example, in one embodiment, the flow specification data type is defined as network layer reachability information (NLRI) that is readily communicated in accordance with BGP protocol 22A when advertising routes. Moreover, the flow specification data type may be defined in a manner that causes the traffic flow criteria 20 to be treated as opaque BGP data. As a result, routers and other network devices that do not support the extension ignore the encoded traffic flow criteria 20 when communicated by BGP protocol 22A.

Applying these techniques to an existing routing protocol (such as BGP) leverages use of the existing infrastructure for the protocol, such as the protocol algorithms, operational experience, and administrative processes, such as inter-provider peering agreements. In short, the techniques use an already established communications infrastructure. Consequently, deployment of the techniques described herein may be accelerated by utilization of these existing systems. The established communications infrastructure includes an internal route distribution infrastructure, and external relationships, such as inter-domain BGP sessions to a customer network.

In operation, router 10 applies traffic flow criteria 20 when forwarding network traffic. In particular, router 10 receives inbound packets from network links 13, applies traffic flow criteria 20 to determine which, if any, of the packets should be filtered, and outputs the unfiltered packets on network links 15. More specifically, upon receiving an inbound packet via one of inbound links 13, a respective one of IFCs 12 relays the packet to control unit 14. In response, control unit 14 reads data from the packet, referred to as the "key," that may include a network destination for the packet. The key may, for example, contain a routing prefix for another router within the network. Based on the key, control unit 14 analyzes routing information 18 generated by routing protocols 22. During this process, control unit 14 applies traffic flow criteria 20 to determine whether the inbound packet matches traffic flow criteria 20. If so, control unit 14 takes an appropriate action, e.g., automatically dropping the packet. Other exemplary actions include updating traffic flow statistics, load balancing, rate limiting, or other actions. Unless the inbound packet is to be dropped, control unit 14 selects a route for the packet, and forwards the packet to an appropriate one of IFCs 12 for output on network links 15.

The architecture of router 10 illustrated in FIG. 2 is for exemplary purposes only, and the principles of the invention are not limited to this architecture. Control unit 14 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. The functions of router 10 may be implemented by executing the instructions of the computer-readable medium with one or more processors, discrete hardware circuitry, firmware, software executing on a programmable processor, or a combination of any of the above.

Figure 3A:
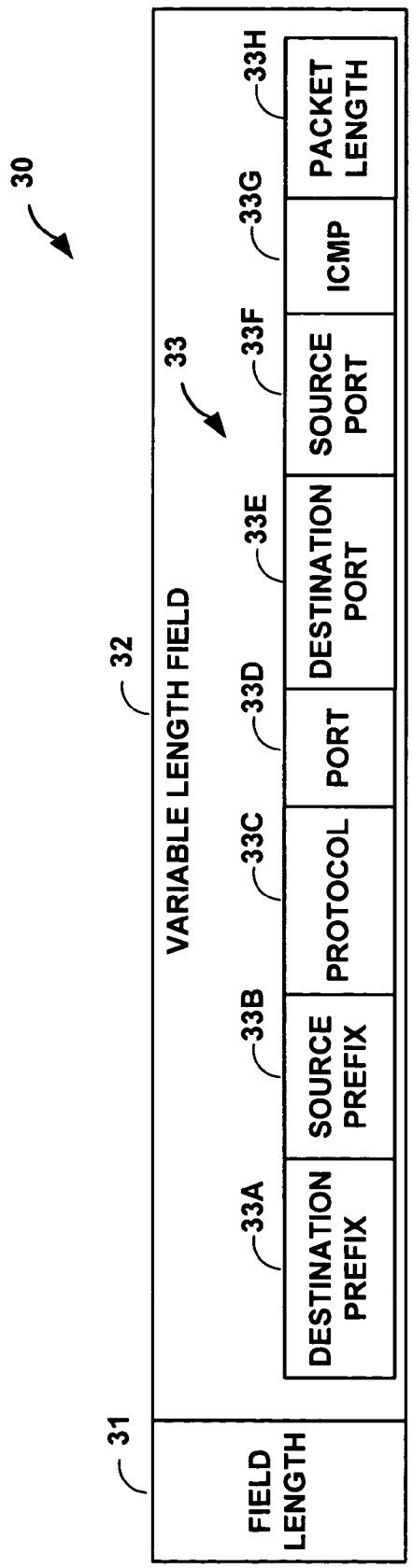
FIG. 3A illustrates an exemplary flow specification data type defined for communication of encoded traffic flow criteria.

FIG. 3A illustrates an exemplary flow specification data type 30 defined for encoding traffic flow criteria 20 (FIG. 2) within a routing communication. In the illustrated embodiment, flow specification data type 30 is encoded as a two-byte field length value 31 followed by a variable length field 32. Field length value 31 specifies the length of field 32, which varies in one embodiment, depending on how many packet flow attributes are encoded within field 32. Encoding a variable number of packet flow attributes within field 30 allows for packet flows to be precisely defined. Example packet flow attributes that may optionally be included are a source address, destination address, source port, destination port, protocol, quality of service (QoS) level, or other flow criteria. In one embodiment, field 32 includes any number of field subcomponents 33, such as destination prefix 33A, source prefix 33B, protocol 33C, port 33D, destination port 33E, source port 33F, ICMP 33G and packet length 33H (collectively, "subcomponents 33").

Figure 3B:
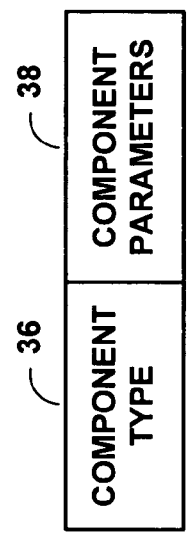
FIG. 3B illustrates a format for subcomponents of the flow specification data type.

FIG. 3B illustrates a format 34 for subcomponents 33 of flow specification data type 30 illustrated in FIG. 3B. Format 34 includes a component type 36 and one or more component parameters 38. The component type 36 may act as a notification that the following bits relate to the stated component type.

Component parameters 38 may include a component length, component value, or the other parameter for specifying the corresponding packet flow attribute. In one example, destination prefix 33A from FIG. 3A has a component type 36 encoded as type '1' over one octet, and the component parameters 38 specifies a length of an encoded destination prefix and a value of the destination prefix. The component length may be encoded over one octet and the component value may be encoded over a variable number of octets based on the component length. In another example, component parameters 38 for subcomponent port 33D include only a value of the port. TABLE 1 lists an exemplary set of subcomponents 33 and, for each of the subcomponents, specifies a corresponding numeric type value used to identify the subcomponent. In addition, for each of the subcomponents, TABLE 1 specifies whether the particular subcomponent includes a length parameter and a component value.

TABLE 1

| COMPONENT | COMPONENT TYPE | COMPONENT LENGTH | COMPONENT VALUE |
| --- | --- | --- | --- |
| Destination Prefix | 1 | 1 octet | Variable |
| Source Prefix | 2 | 1 octet | Variable |
| Protocol | 3 | N/A | 1 octet |
| Port | 4 | N/A | 2 octet |
| Destination Port | 5 | N/A | 2 octet |
| Source Port | 6 | N/A | 2 octet |
| ICMP Type | 7 | N/A | 1 octet |
| Packet Length | 8 | N/A | 2 octet |

Although not identified in TABLE 1, one or more additional subcomponents may be defined to specify appropriate actions to be applied to traffic that matches the encoded traffic flow criteria.

FIG. 4A illustrates one exemplary encoding of traffic flow criteria in accordance with the flow specification data type described herein. In the example encoding, variable-length data field 40 has been encoded to include a destination prefix subcomponent 48 and a source prefix subcomponent 49 for encoding traffic flow criteria for controlling network traffic. In addition, field length 41 indicates the number of specific subcomponents in variable length data field 40 that to encode flow criteria, i.e., two.

Each of destination prefix subcomponent 48 and source prefix subcomponent 49 includes a component type and one or more component parameters. For example, destination prefix component 48 includes a destination prefix type 42, a destination prefix length 43, and a destination prefix value 44. The value of destination prefix length 43 defines the number of bits used for encoding the destination prefix value 44. In addition to destination prefix component 48, data field 40 specifies source prefix subcomponent 49 having a source prefix type 45, a source prefix length 46, and a source prefix value 47.

FIG. 4B illustrates another exemplary encoding of traffic flow criteria in accordance with the flow specification data type. In the example of FIG. 4B, an exemplary data field 50 is illustrated as well as exemplary hexadecimal ("hex") data in accordance with the encoding scheme described herein.

In this example, field length 51 contains a value of hex '0A,' which specifies the length of the data field 50. As shown in FIG. 4B, data field 50 includes a destination prefix subcomponent that includes a destination prefix type 52 having a value of hex '01,' which acts as a notification that the following bits relate to the destination prefix. Destination prefix length 53 contains a value of hex '18' (decimal 24), which indicates that destination prefix 54 is encoded in 24 bits, or 3 octets. In this example, the 24 bits of destination prefix 54 contains a hex value of '0A0101.'

The protocol subcomponent includes a protocol type 55 that contains a value of hex '03,' which acts as a notification that the following bits relate to the protocol. The component parameter specifies a particular protocol 56, and includes a value of hex '06' to represent a corresponding protocol.

The port subcomponent of data field 50 further includes a port type 57 that contains a hex value of '04,' which acts as a notification that the following bits relate to the port. The port subcomponent further includes a component parameter 58 that specifies an encoded port in two octets as defined by TABLE 1. For example, port 58 contains a value of hex '0019.'

Figure 5:
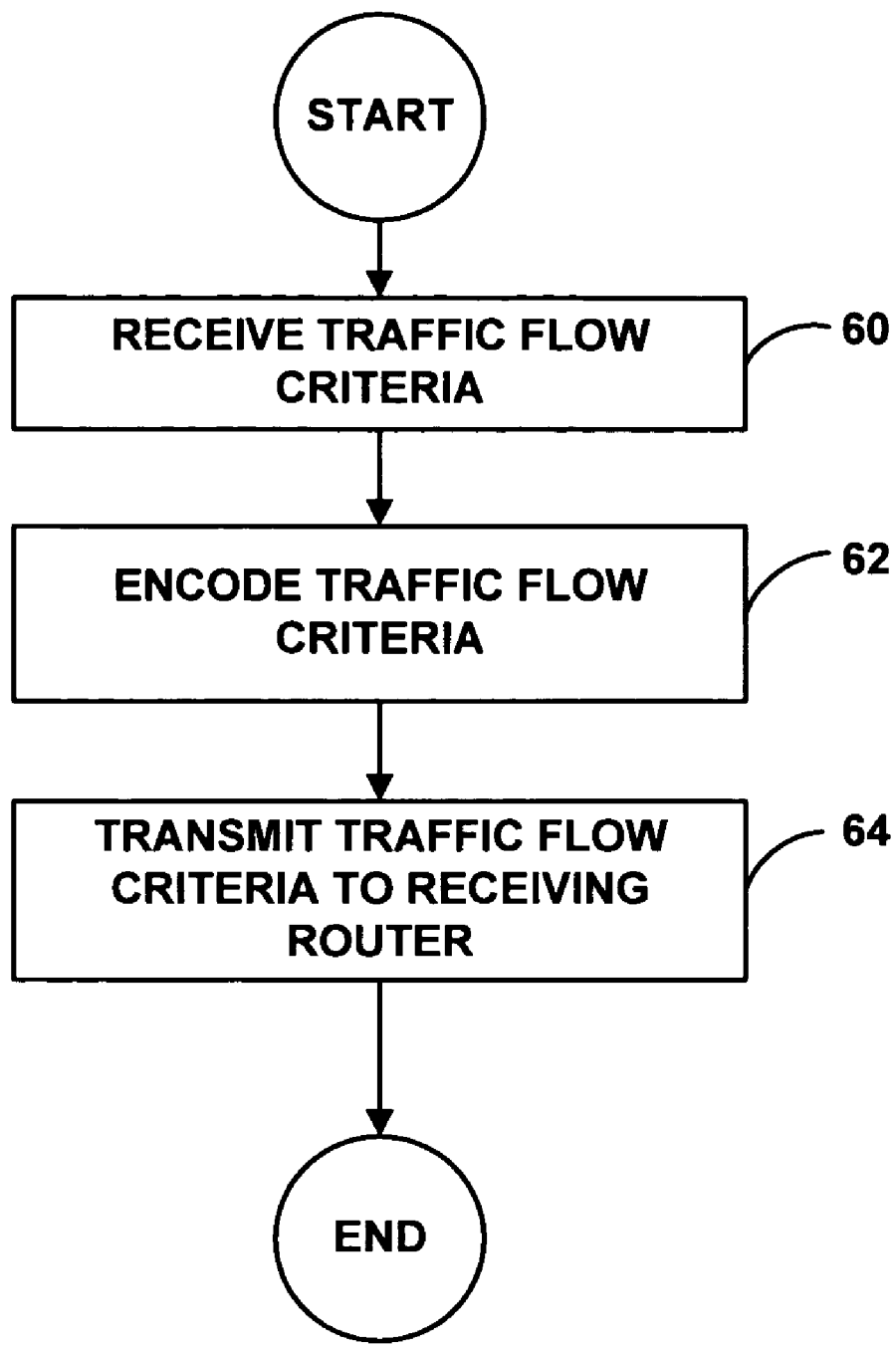
FIG. 5 is a flow diagram illustrating example operation of a router that distributes traffic flow criteria in accordance with the principles of the invention.

FIG. 5 is a flow diagram illustrating example operation of a distributing router that distributes traffic flow criteria in accordance with the principles of the invention. For exemplary purposes, the flow diagram of FIG. 5 will be explained in reference to FIG. 1 and, in particular, routers 4.

Initially, a distributing router, such as router 4B, receives traffic flow criteria (60), which originates from a user, a software program, or other source. In one example, a user or software program defines the traffic flow criteria by specifying one or more packet flow attributes. The traffic flow criteria describe notable, desirable, or undesirable traffic, depending on the application at hand.

For example, the packet flow attributes may includes destination information, source information, protocol information, port information, ICMP type, packet length, or other packet flow attributes. Destination and source information includes destination and source prefixes respectively. Port information includes destination port information or source port information.

Next, distributing router 4B encodes the specified traffic flow attributes as traffic flow criteria in accordance with the flow specification data type described herein (62). After the traffic flow criteria are encoded in a data field, distributing router 4B transmits the encoded traffic flow criteria to a receiving router, such as receiving router 4C, via routing communication 11 in accordance with a protocol, such as BGP (64).

Figure 6:
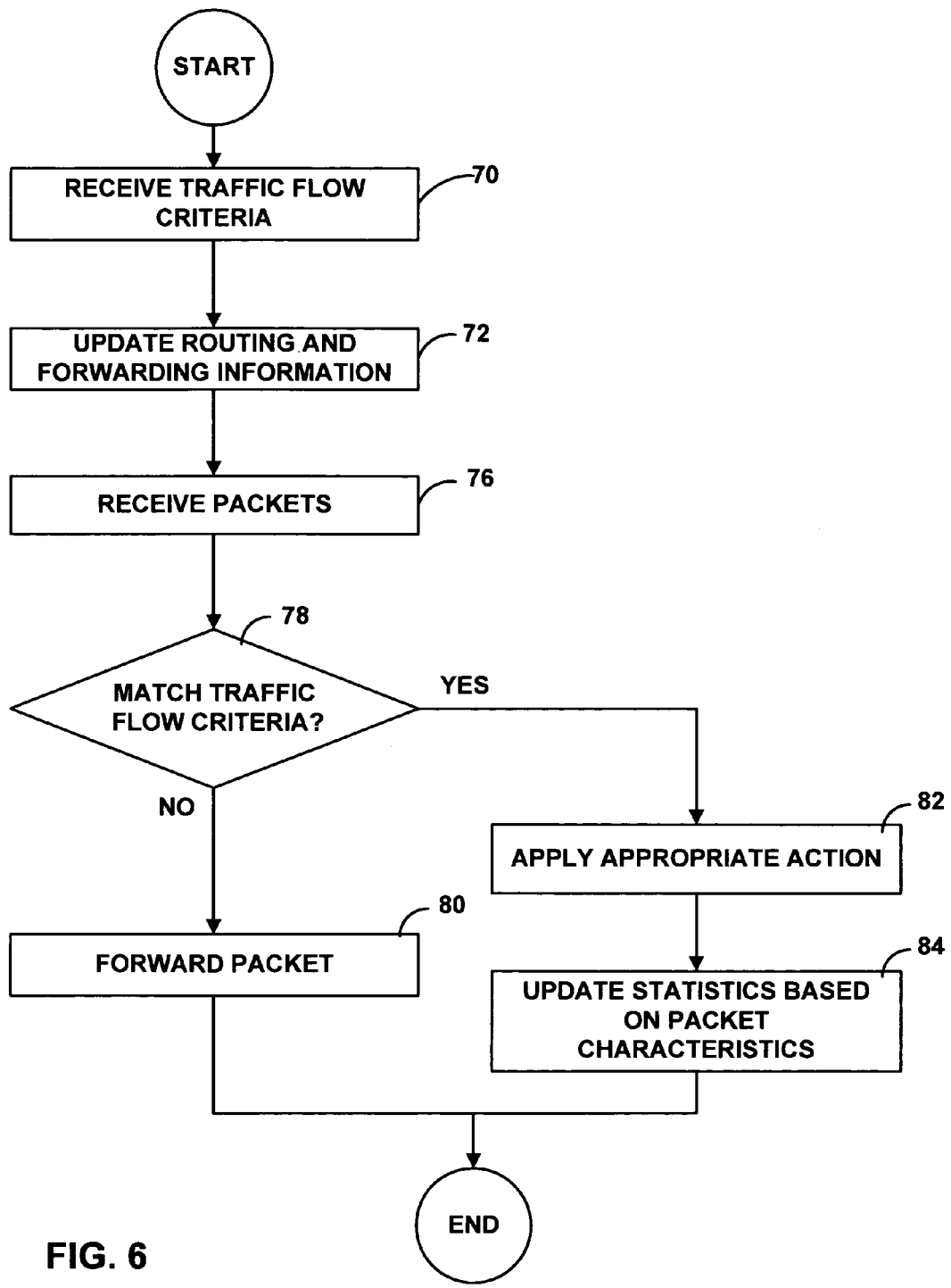
FIG. 6 is a flow diagram illustrating exemplary operation of a router receiving and applying traffic flow criteria distributed in accordance with the principles of the invention.

FIG. 6 is a flow diagram illustrating exemplary operation of a router receiving distributed traffic flow criteria in accordance with the principles of the invention. For exemplary purposes, the flow diagram of FIG. 6 will be explained in reference to FIGS. 1 and 2.

Initially, a receiving router, such as router 4C, receives encoded traffic flow criteria (70) from the distributing router, e.g., router 4B. The traffic flow criteria are encoded on a packet transmitted via a protocol such as BGP. As described, the traffic flow criteria may be communicated in association with one or more advertised routes. Router 4C receives the routing communication and updates routing and forwarding information based on the received route (72).

In one embodiment, router 4C compares the advertised route with a routing information base to determine whether the advertised specifies a preferred path, e.g., shortest, to the specified destination. If so, router 4C accepts the advertised route and associated traffic flow criteria. If not, router 4C rejects the router and the associated traffic flow criteria.

Upon updating the routing and forwarding information, router 4C receives incoming packets (76), and applies appropriate actions to those incoming packets that satisfy the received traffic flow criteria. Control unit 14 of FIG. 2, for example, compares the incoming packets to the traffic flow criteria (78). For those packets matching the traffic flow criteria, control unit 14 applies an appropriate action (82).

The appropriate action provides control of traffic flow, which could include load balancing, rate limiting, filtering, or other actions. In one embodiment, the appropriate action is predefined. In another embodiment, routing communication that specified the traffic flow criteria also specifies the appropriate action to be taken. Although not illustrated in FIG. 6, router 4C may forward the packets after applying an action, such as updating statistics based on characteristics of the matching packets (84). Actions may be applied by router 4C, or the network traffic may be forwarded to a network analyzer or other device.

Router 4C forwards the packets that do not match the traffic flow criteria according to forwarding information (80).

Figure 7:
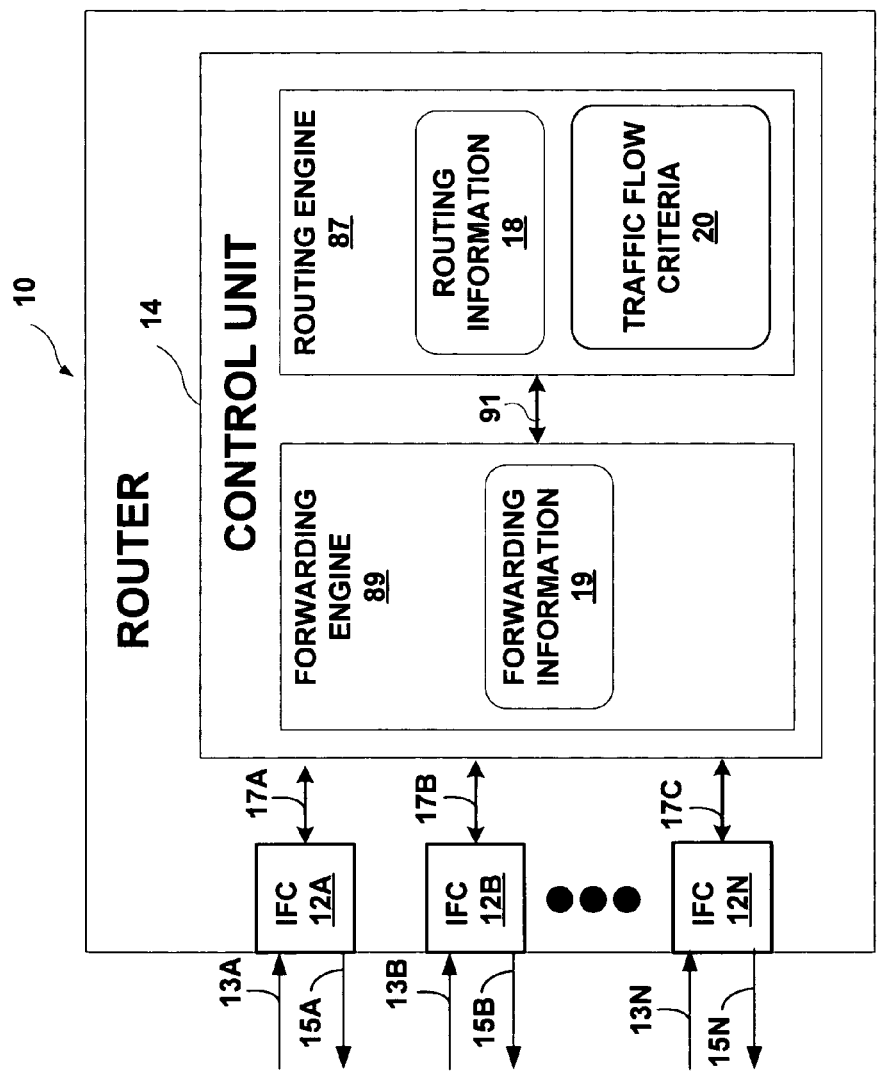
FIG. 7 is a block diagram illustrating an exemplary router that distributes or receives traffic flow criteria through a network consistent with the principles of the invention.

FIG. 7 is a block diagram illustrating one embodiment of router 10 (FIG. 2) in further detail. As described in FIG. 2, router 10 includes interface cards 12A-12N (collectively, "IFCs 12") that receive and send packet flows via network links 13 and 15, respectively. IFCs 12 are typically coupled to network links 13, 15 via a number of interface ports (not shown), and forward and receive packets and control information from control unit 14 via respective interfaces 17.

In the exemplary embodiment of FIG. 7, the functionality of control unit 14 is divided between a routing engine 87 and a forwarding engine 89 coupled by a communication link 91. Routing engine 87 maintains routing information 18. In practice, control unit 14 receives incoming routing information from other routing devices and, based on the incoming routing information, routing engine 87 updates routing information 18. In accordance with the techniques described herein, the incoming routing information may include encoded traffic flow criteria. Routing information 18 takes the form of one or more tables, databases, link lists, radix trees, databases, flat files, or any other data structures.

Routing engine 87 processes the routing information received via one or more routing protocols, such as BGP, and updates routing information 18. Routing engine 87 further analyzes routing information 18 and generates forwarding information 19 for forwarding engine 89. Forwarding information 19 may associate, for example, network destinations with specific next hops and corresponding IFCs 12. Forwarding information 19 can be written to a link list, a radix tree, a database, a flat file, or various other data structures. In practice, forwarding engine 89 forwards packets based on the forwarding information 19 generated by the routing engine 87. Routing engine 87 distributes or receives traffic flow criteria 20, as described herein, and updates forwarding information 19 based on the traffic flow criteria.

Figure 8:
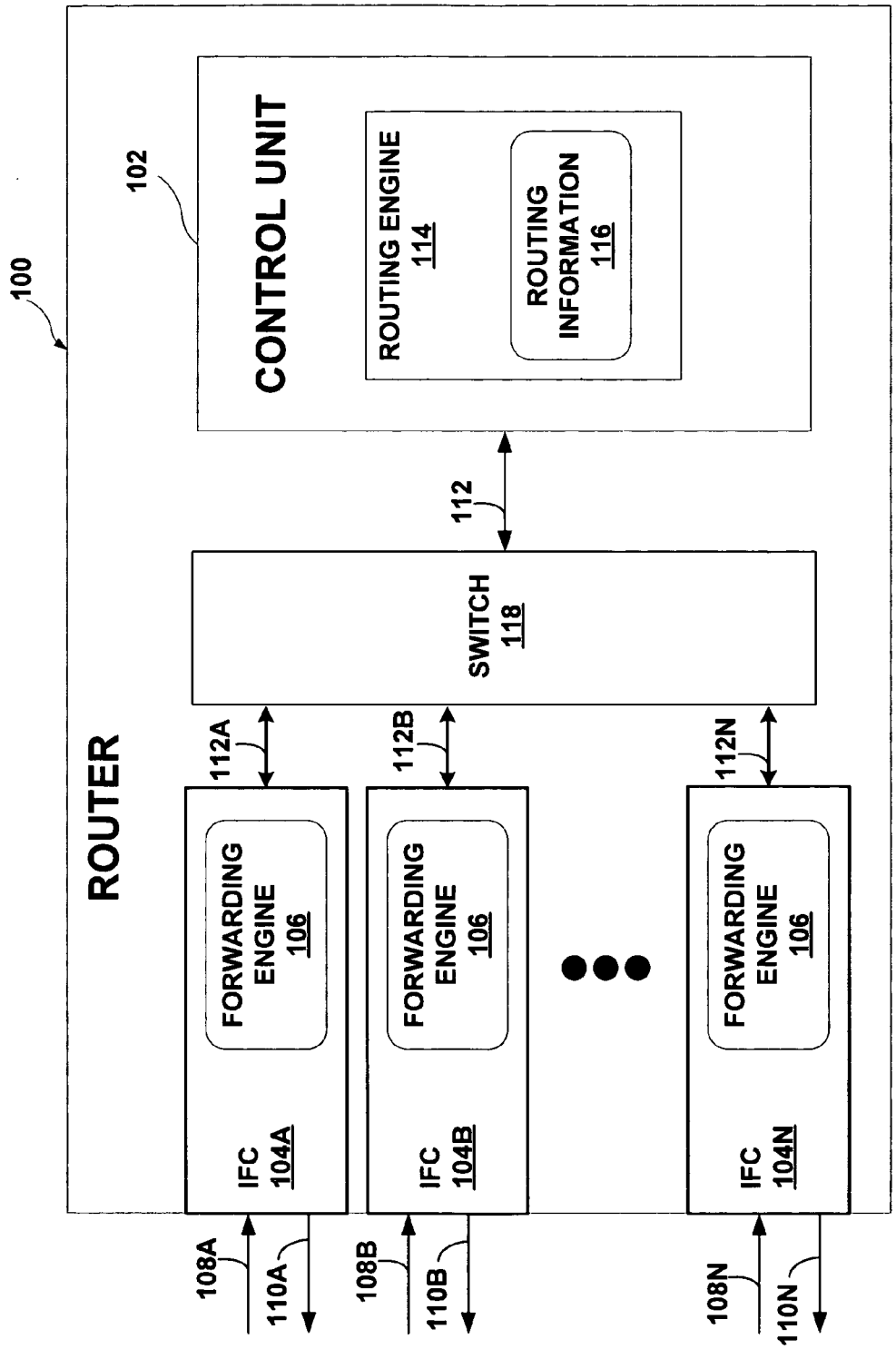
FIG. 8 is a block diagram illustrating another embodiment of a router that distributes or receives traffic flow criteria throughout a network consistent with the principles of the invention.

FIG. 8 is a block diagram illustrating another embodiment of a router 100 that distributes or receives traffic flow criteria throughout a network consistent with the principles of the invention. Router 100 includes a routing engine 114 that maintains routing information 116 that describes the topology of a network. Routing engine 114 analyzes stored routing information 116 and generates forwarding information (not shown) for interface cards interface cards 104A-104N (collectively, "IFCs 104"). In other words, in contrast to the exemplary router 10 of FIG. 7, router 100 does not include centralized forwarding hardware. In particular, router 100 distributes the forwarding functionality to IFCs 104.

IFCs 104 receive and send packet flows via network links 108 and 110, respectively and are interconnected by a high-speed switch 118 and links 112. In one example, switch 118 comprises switch fabric, switchgear, a configurable network switch or hub, and the like. Links 112 comprise any form of communication path, such as electrical paths within an integrated circuit, external data busses, optical links, network connections, wireless connections, and the like. IFCs 104 are coupled to network links 108, 110 via a number of interface ports (not shown). Each of IFCs 104 comprise a forwarding engine 106 that forwards packets in accordance with forwarding information generated by routing engine 114. Routing engine 114 distributes or receives traffic flow criteria 20 as described herein, and updates forwarding engines 106 based on the traffic flow criteria.

Various embodiments of the invention have been described. Network devices, such as routers, have been described that distribute traffic flow criteria to protect targeted devices against network attacks, such as (Denial of Service) DoS attacks. The targeted devices may, for example, include routers, customer servers or workstations, or other devices within a network. These and other embodiments are within the scope of the following claims.

The invention claimed is:

1. A method for distributing traffic flow criteria between network devices, the method comprising:
    defining a flow specification data type for a routing protocol, wherein the flow specification data type allows a variable number of packet flow attributes to be specified for a packet flow through a network;
    generating, with a first routing device, a message that encodes routing topology information, wherein the routing topology information defines at least one route between a first network device and a second network device, and traffic flow criteria specifying the packet flow in accordance with the flow specification data type; and
    communicating, with the first routing device, the message to a second routing device to direct the second routing device to control network traffic based on the traffic flow criteria,
    wherein the traffic flow criteria comprises source information that identifies a source network device of the packet flow, wherein the traffic flow criteria specifies an appropriate action that is performed on the network packet.

2. The method of claim 1, wherein defining a flow specification data type comprises defining the flow specification data type as information associated with a route advertised by the message.

3. The method of claim 1, wherein defining a flow specification data type comprises defining the flow specification data type as network layer reachability information (NLRI) that is associated with a route advertised by the message.

4. The method of claim 1, wherein defining a flow specification data type comprises defining the flow specification type to include a length field that indicates the number of packet flow attributes specified.

5. The method of claim 1, the flow specification data type including multiple subcomponents, wherein defining a flow specification data type comprises defining each of the subcomponents to include a subcomponent type field and a set of value fields.

6. The method of claim 1, wherein defining a flow specification data type comprises defining a subcomponent for specifying a destination prefix.

7. The method of claim 1, wherein defining a flow specification data type comprises defining subcomponents for specifying a destination prefix, a source prefix, a protocol, a source port, a destination port, an ICMP type, and a packet length.

8. The method of claim 1, wherein the routing protocol is the Border Gateway Protocol (BGP).

9. The method of claim 1, wherein defining a flow specification data type comprises redefining a preexisting data type of the routing protocol to define the flow specification data type.

10. The method of claim 1, wherein defining a flow specification data type comprises defining the flow specification data type as an application-specific data type in accordance with the routing protocol.

11. The method of claim 1, wherein defining a flow specification data type further comprises assigning an application-specific identifier to the flow specification data type to direct the router to install the traffic flow criteria within an independent routing information base (RIB).

12. The method of claim 1, further comprising:
    assigning an application-specific identifier to the flow specification data type; and
    configuring a policy to selectively enable distribution of the traffic flow criteria based on the application-specific identifier.

13. The method of claim 12, wherein assigning an application-specific identifier comprises assigning an Address Family Identifier (AFI) and Subsequent Address Family Identifier (SAFI) to the flow specification data type.

14. The method of claim 1, wherein the appropriate action includes one of load balancing, rate limiting, and filtering.

15. A method for distributing traffic flow criteria between network devices, the method comprising:
    receiving a routing communication that encodes routing topology information, wherein the routing topology information defines at least one route between a first network device and a second network device, and traffic flow criteria specifying the packet flow in accordance with a flow specification data type for a routing protocol, wherein the flow specification data type allows a variable number of packet flow attributes to be specified for a packet flow through a network; and
    controlling network traffic in accordance with the traffic flow criteria,
    wherein the traffic flow criteria comprises source information that identifies a source network device of the packet flow, wherein the traffic flow criteria specifies an appropriate action that is performed on the network packet.

16. The method of claim 15, wherein controlling network traffic includes one of load balancing, rate limiting, and filtering the network traffic in accordance with the traffic flow criteria.

17. The method of claim 15, wherein the flow specification data type is defined as information associated with a route advertised by the routing communication.

18. The method of claim 17, wherein the flow specification data type is defined as network layer reachability information (NLRI) that is associated with a route advertised by the message.

19. The method of claim 15, wherein the flow specification data type includes a length field for specifying the number of packet flow attributes specified.

20. The method of claim 15, the flow specification data type including multiple subcomponents, wherein each of the subcomponents includes a subcomponent type field and a set of value fields.

21. The method of claim 15, wherein the appropriate action includes one of load balancing, rate limiting, and filtering.

22. The method of claim 15, wherein the routing communication further specifies a route to a network destination, the method further comprising:
    comparing the specified route to a routing information base; and
    rejecting the traffic flow criteria based on the comparison when the route does not specify a preferred path to the network destination.

23. The method of claim 15, wherein receiving a routing communication comprises communicating with a router in accordance with the routing protocol.

24. The method of claim 15, wherein the routing protocol is the Border Gateway Protocol (BGP).

25. The method of claim 15, wherein the flow specification data type is encoded by redefining a preexisting data type of the routing protocol to define the flow specification data type.

26. The method of claim 15, wherein the flow specification data type is defined as an application-specific data type in accordance with the routing protocol.

27. The method of claim 15, wherein an application-specific identifier is assigned to the flow specification data type to direct the receiving router to install the traffic flow criteria within an independent routing information base (RIB).

28. The method of claim 15, wherein an application-specific identifier is assigned to the flow specification data type.

29. The method of claim 28, wherein the application-specific identifier includes an Address Family Identifier (AFI) and Subsequent Address Family Identifier (SAFI).

30. The method of claim 15, further comprising updating a log that includes information about the routing communication.

31. A network device comprising:
    a control unit to generate a message that encodes routing topology information, wherein the routing topology information defines at least one route between a first network device and a second network device, and traffic flow criteria specifying the packet flow in accordance with a flow specification data type, wherein the flow specification data type allows a variable number of packet flow attributes to be specified for a packet flow through a network; and
    an interface card to communicate the message to a routing device in accordance with a routing protocol,
    wherein the message directs the control unit to apply an appropriate action to network traffic based on the traffic flow criteria, and
    wherein the traffic flow criteria comprises source information that identifies a source network device of the packet flow.

32. The network device of claim 31, wherein the control unit defines the flow specification data type as information associated with a route advertised by the message.

33. The network device of claim 32, wherein the control unit defines the flow specification data type as network layer reachability information (NLRI) that is associated with a route advertised by the message.

34. The network device of claim 31, wherein the control unit defines subcomponents for specifying a destination prefix, a source prefix, a protocol, a source port, a destination port, an ICMP type, and a packet length.

35. The network device of claim 31, wherein the routing protocol is the Border Gateway Protocol (BGP).

36. The network device of claim 31, wherein the control unit redefines a preexisting data type of the routing protocol to define the flow specification data type.

37. The network device of claim 31, wherein the control unit defines the flow specification data type as an application-specific data type in accordance with the routing protocol.

38. A network device comprising:
    an interface card to receive routing communication that encodes routing topology information, wherein the routing topology information defines at least one route between a first network device and a second network device, and traffic flow criteria specifying the packet flow in accordance with a flow specification data type for a routing protocol, wherein the flow specification data type allows a variable number of packet flow attributes to be specified for a packet flow through a network; and
    a control unit to compare network traffic to the traffic flow criteria, and apply an appropriate action to the network traffic,
    wherein the traffic flow criteria comprises source information that identifies a source network device of the packet flow.

39. The network device of claim 38, wherein the appropriate action includes one of load balancing, rate limiting, and filtering the network traffic in accordance with the traffic flow criteria.

40. The network device of claim 38, wherein the flow specification data type is defined as information associated with a route advertised by the routing communication.

41. The network device of claim 38, wherein the flow specification data type is defined as network layer reachability information (NLRI) that is associated with a route advertised by the message.

42. The network device of claim 38, wherein the routing protocol is the Border Gateway Protocol (BGP).

43. The network device of claim 38, wherein the flow specification data type is defined as an application-specific data type in accordance with the routing protocol.

44. The network device of claim 38, wherein an application-specific identifier is assigned to the flow specification data type, and the control unit install the traffic flow criteria within an independent routing information base (RIB) in response to the application-specific identifier.

45. A system comprising:
    a first network device to generate a message that encodes routing topology information, wherein the routing topology information defines at least one route between a first network device and a second network device, and traffic flow criteria specifying the packet flow in accordance with a flow specification data type, and communicate the message to a second routing device via a routing protocol, wherein the flow specification data type allows a variable number of packet flow attributes to be specified for a packet flow through a network; and a second network device to receive the message, compare network traffic to the traffic flow criteria, and apply an appropriate action to the network traffic based on the traffic flow criteria, wherein the traffic flow criteria comprises source information that identifies a source network device of the packet flow.

46. The system of claim 45, wherein the first network device defines the flow specification data type as information associated with a route advertised by the message.

47. The system of claim 45, wherein the first network device defines the flow specification data type as network layer reachability information (NLRI) that is associated with a route advertised by the message.

48. The system of claim 45, wherein the first network device defines subcomponents for specifying a destination prefix, a source prefix, a protocol, a source port, a destination port, an ICMP type, and a packet length.

49. The system of claim 45, wherein the routing protocol is the Border Gateway Protocol (BGP).

50. The system of claim 45, wherein the first network device defines a preexisting data type of the routing protocol to define the flow specification data type.

51. The system of claim 45, wherein the appropriate action includes one of load balancing, rate limiting, and filtering the network traffic in accordance with the traffic flow criteria.

52. The system of claim 45, wherein the flow specification data type is defined as an application-specific data type in accordance with the routing protocol.

53. The system of claim 45, wherein an application-specific identifier is assigned to the flow specification data type.

54. A computer-readable medium comprising instructions for causing a programmable processor to:

define a flow specification data type for a routing protocol, wherein the flow specification data type allows a variable number of packet flow attributes to be specified for a packet flow through a network;

generate a message that encodes routing topology information, wherein the routing topology information defines at least one route between a first network device and a second network device, and traffic flow criteria specifying the packet flow in accordance with the flow specification data type; and communicate the message to a routing device to direct the routing device to control network traffic based on the traffic flow criteria, wherein the traffic flow criteria comprises source information that identifies a source network device of the packet flow, wherein the traffic flow criteria specifies an appropriate action that is performed on the network packet.

55. The computer-readable medium of claim 54, wherein defining a flow specification data type comprises defining the flow specification data type as information associated with a route advertised by the message.

56. The computer-readable medium of claim 54, wherein defining a flow specification data type comprises defining the flow specification data type as network layer reachability information (NLRI) that is associated with a route advertised by the message.

57. The computer-readable medium of claim 54, wherein defining a flow specification data type comprises defining subcomponents for specifying a destination prefix, a source prefix, a protocol, a source port, a destination port, an ICMP type, and a packet length.

58. The computer-readable medium of claim 54, wherein the routing protocol is the Border Gateway Protocol (BGP).

59. The computer-readable medium of claim 54, wherein defining a flow specification data type comprises redefining a preexisting data type of the routing protocol to define the flow specification data type.

60. The computer-readable medium of claim 54, wherein defining a flow specification data type comprises defining the flow specification data type as an application-specific data type in accordance with the routing protocol.

61. The computer-readable medium of claim 54, wherein defining a flow specification data type further comprises assigning an application-specific identifier to the flow specification data type to direct the router to install the traffic flow criteria within an independent routing information base (RIB).

62. A computer-readable medium comprising instructions for causing a programmable processor to:

receive a routing communication that encodes routing topology information, wherein the routing topology information defines at least one route between a first network device and a second network device, and traffic flow criteria specifying the packet flow in accordance with a flow specification data type for a routing protocol, wherein the flow specification data type allows a variable number of packet flow attributes to be specified for a packet flow through a network; and control network traffic in accordance with the traffic flow criteria, wherein the traffic flow criteria comprises source information that identifies a source network device of the packet flow, wherein the traffic flow criteria specifies an appropriate action that is performed on the network packet.

63. The computer-readable medium of claim 62, further comprising instructions to cause the processor to control network traffic by performing one of load balancing, rate limiting, and filtering the network traffic in accordance with the traffic flow criteria.

64. The computer-readable medium of claim 62, wherein the flow specification data type is defined as information associated with a route advertised by the routing communication.

65. The computer-readable medium of claim 62, wherein the flow specification data type is defined as network layer reachability information (NLRI) that is associated with a route advertised by the message.

66. The computer-readable medium of claim 62, wherein the routing protocol is the Border Gateway Protocol (BGP).

67. The computer-readable medium of claim 62, wherein the flow specification data type is encoded by redefining a preexisting data type of the routing protocol to define the flow specification data type.

68. The computer-readable medium of claim 62, wherein the flow specification data type is defined as an application-specific data type in accordance with the routing protocol.

69. The computer-readable medium of claim 62, wherein an application-specific identifier is assigned to the flow specification data type.

70. The method of claim 1, wherein generating a message further comprises encoding routing information in accordance with the routing protocol.

71. The method of claim 70, wherein the routing protocol is the Border Gateway Protocol (BGP).

72. The method of claim 70, wherein communicating the message to a routing device to direct the routing device to control network traffic further comprises communicating the message to a routing device to direct the routing device to control network traffic based on the routing information.

73. The method of claim 15, wherein the routing communication further encodes routing information in accordance with the routing protocol.

74. The method of claim 73, wherein the routing protocol is the Border Gateway Protocol (BGP).

75. The method of claim 73, wherein controlling network traffic further comprises controlling network traffic based on the routing information.

76. The network device of claim 31, wherein the message further encodes routing information in accordance with the routing protocol.

77. The network device of claim 76, wherein the routing protocol is the Border Gateway Protocol (BGP).

78. The network device of claim 76, wherein the message further directs the control unit to apply an appropriate action to network traffic based on the routing information.

79. The network device of claim 38, wherein the routing communication further encodes routing information in accordance with the routing protocol.

80. The network device of claim 79, wherein the routing protocol is the Border Gateway Protocol (BGP).

81. The network device of claim 79, wherein the control unit further applies an appropriate action to network traffic based on the routing information.

82. The system of claim 45, wherein generating a message further comprises generating a message that encodes routing information in accordance with the routing protocol.

83. The system of claim 82, wherein the routing protocol is the Border Gateway Protocol (BGP).

84. The system of claim 82, wherein applying an appropriate action to the network traffic further comprises applying an appropriate action to network traffic based on the routing information.

85. The computer-readable medium of claim 54, wherein generating a message further comprises generating a message that encodes routing information in accordance with the routing protocol.

86. The system of claim 85, wherein the routing protocol is the Border Gateway Protocol (BGP).

87. The system of claim 85, wherein communicating the message to a routing device to direct the routing device to control network traffic further comprises communicating the message to a routing device to direct the routing device to control network traffic based on the routing information.

88. The computer-readable medium of claim 62, wherein the routing communication further encodes routing information in accordance with a routing protocol.

89. The network device of claim 88, wherein the routing protocol is the Border Gateway Protocol (BGP).

90. The network device of claim 88, wherein controlling network traffic further comprises controlling network traffic based on the routing information.

* * * * *

UNITED STATES PATENT AND TRADEMARK OFFICE
CERTIFICATE OF CORRECTION

| | |
|---|---|
| PATENT NO. | : 7,773,596 B1 |
| APPLICATION NO. | : 10/782291 |
| DATED | : August 10, 2010 |
| INVENTOR(S) | : Pedro R. Marques |

It is certified that error appears in the above-identified patent and that said Letters Patent is hereby corrected as shown below:

In the Claims

Column 15, line 33 (Claim 54), "A computer-readable medium" should be -- A non-transitory computer-readable medium --

Column 15, line 52 (Claim 55), "The computer-readable medium" should be -- The non-transitory computer-readable medium --

Column 15, line 56 (Claim 56), "The computer-readable medium" should be -- The non-transitory computer-readable medium --

Column 15, line 61 (Claim 57), "The computer-readable medium" should be -- The non-transitory computer-readable medium --

Column 15, line 66 (Claim 58), "The computer-readable medium" should be -- The non-transitory computer-readable medium --

Column 16, line 1 (Claim 59), "The computer-readable medium" should be -- The non-transitory computer-readable medium --

Column 16, line 5 (Claim 60), "The computer-readable medium" should be -- The non-transitory computer-readable medium --

Column 16, line 9 (Claim 61), "The computer-readable medium" should be -- The non-transitory computer-readable medium --

Column 16, line 15 (Claim 62), "The computer-readable medium" should be -- The non-transitory computer-readable medium --

Column 16, line 32 (Claim 63), "The computer-readable medium" should be -- The non-transitory computer-readable medium --

Column 16, line 37 (Claim 64), "The computer-readable medium" should be -- The non-transitory computer-readable medium --

Column 16, line 41 (Claim 65), "The computer-readable medium" should be -- The non-transitory computer-readable medium --

Column 16, line 45 (Claim 66), "The computer-readable medium" should be -- The non-transitory computer-readable medium --

Column 16, line 47 (Claim 67), "The computer-readable medium" should be -- The non-transitory computer-readable medium --

Signed and Sealed this
Twenty-seventh Day of May, 2014

Michelle K. Lee
*Deputy Director of the United States Patent and Trademark Office*

CERTIFICATE OF CORRECTION (continued)
U.S. Pat. No. 7,773,596 B1

Column 16, line 52 (Claim 68), "The computer-readable medium" should be -- The non-transitory computer-readable medium --

Column 16, line 55 (Claim 69), "The computer-readable medium" should be -- The non-transitory computer-readable medium --

Column 18, line 7 (Claim 85), "The computer-readable medium" should be -- The non-transitory computer-readable medium --

Column 18, line 18 (Claim 88), "The computer-readable medium" should be -- The non-transitory computer-readable medium --